March 15, 1960 G. A. WORN ET AL 2,928,166
TUBE WELDING
Filed Feb. 17, 1955 2 Sheets-Sheet 1

INVENTORS
George A. Worn and
Edward J. Vanderman
BY Nathaniel Ely
ATTORNEY

March 15, 1960 G. A. WORN ET AL 2,928,166
TUBE WELDING
Filed Feb. 17, 1955 2 Sheets-Sheet 2

INVENTOR
George A. Worn and
Edward J. Vanderman
BY
Nathaniel Ely
ATTORNEY

United States Patent Office 2,928,166
Patented Mar. 15, 1960

2,928,166

TUBE WELDING

George A. Worn and Edward J. Vanderman, Amityville, N.Y., assignors to The Lummus Company, New York, N.Y., a corporation of Delaware Application February 17, 1955, Serial No. 488,816

2 Claims. (Cl. 29—157.5)

Our invention relates to improvements in fluid heat exchange devices, and is more particularly concerned with such apparatus as high pressure feed water heaters and the like utilizing large pressure chambers including tube sheets to which tubular members are connected and the method of making the same.

In the development of tubular heat exchange and unfired heat-transfer equipment, operating pressures and temperatures have become higher and higher until in some heat-transfer equipment, particularly in power, chemical, petroleum and atomic energy installations, operating pressures of up to 3,500 p.s.i. and higher and temperatures of up to 500° F. and higher have proven to be desirable to obtain optimum efficiency.

At present in most exchangers using heat-transfer tubes, tube to tube sheet connections and joints are of mechanical design and include such fabrication processes as expanding each tube to its tube sheet bore, or threading each tube into a threaded tube sheet bore, or connecting the tubes by the use of ferrules, or various combinations of these and other lock-seal methods. In recent years, where heat-transfer equipment has included internal heat-transfer or reaction tubes and where the tube to shell or tube sheet connection has had to be made stronger to withstand greater pressures and other special operational conditions, there have been some exchangers with the tubes welded to the shell or tube sheet.

As the joints between the individual tubes and tube sheets must remain tight under severe operating conditions including expansion and contraction due to temperature and pressure changes, corrosion and chemical attack, in addition to extremes of pressure and vacuum, the transition from pure mechanical connecting means to welded joints in heat-transfer equipment has been slow. In many modern tube to tube sheet assemblies, which are to be subjected to medium to high pressures and temperatures, and particularly where the tubes and tube sheet are of dissimilar metal the connections employ mechanical anchors as the principal locking means in the joint and a weld which merely acts as a seal. Tube to tube sheet fabrication of similar metals employing welding as the primary means of connection for strength, as well as to seal, has in the past included joint deisgns wherein the tube end is flush with, extends beyond, or is recessed from the face of the tube sheet with the weld applied as a bead or fillet. Other joint designs have included the use of beveled edges on the tube sheet bores and various distortions of the tube ends.

The acual welding process has been accomplished by a great number of means of which two have proven to be of most general interest and comprise the major classifications of arc welding and brazing. The general category of arc welding includes the more specific processes of shielded metal-arc welding with coated electrodes and inert gas-metal arc welding. Under the general classification of brazing, the specific processes of torch, furnace and dip brazing, have been employed in tube to tube sheet joining.

Of the above noted connections including various processes of welding, we are unaware of a design or combination design that has consistently produced sound welds in heat exchange apparatus of the type heretofore referred to where the tubes and tube sheet are of dissimilar metals. Where the high pressure, high temperature heat-transfer device of tubular design may involve up to and frequently more than 2500 tubes, each of which may require welding at both ends, it is obvious that some welding methods will develop a large percentage of leaks and thus require repeated hydrostatic pressure tests on the welds during fabrication to determine their soundness. These are uneconomical and may tend to prohibit the use of welded tube connections. Welds which have minute cracks or checks are highly undesirable and entirely unsatisfactory because under heat cycling they tend to open causing disastrous leaks. This is particularly true where attempts are made to weld copper alloy materials to carbon steel with the carbon causing shortening of the weld material with consequent checking.

It is a principal object of our invention to provide a novel method for the joining of tubular conduits to their respective tube sheet, headers or shell by welding which will produce sound welded joints for high pressure apparatus.

Another object of our invention is to provide a novel method for producing sound high pressure welded tube to tube sheet joints which will withstand severe initial shell side hydrostatic and thermal cycling tests.

Still another object of our invention is to provide a novel method of welding metallic tubes to tube sheets of dissimilar metals in which the resultant joints form complete metallic bonds between the tube sheet and weld metal and between weld metal and the tubes and in which the joints can withstand initial hydrostatic pressure tests of pressures up to 6,000 p.s.i. and greater and will further remain tight under severe conditions of expansion and contraction of the metals because of temperature variations while being subjected to corrosion and other chemical attacks.

Other objects and advantages of our invention will appear from the following description thereof taken in connection with the attached drawing wherein.

In brief, our present invention may be described as a method of joining tubes to tube sheets by welding, whereby the resultant joints are completely sound when subjected to very high pressure and temperature conditions and other detrimental effects normally prevalent in modern high pressure equipment such as heat exchangers.

Figure 1:
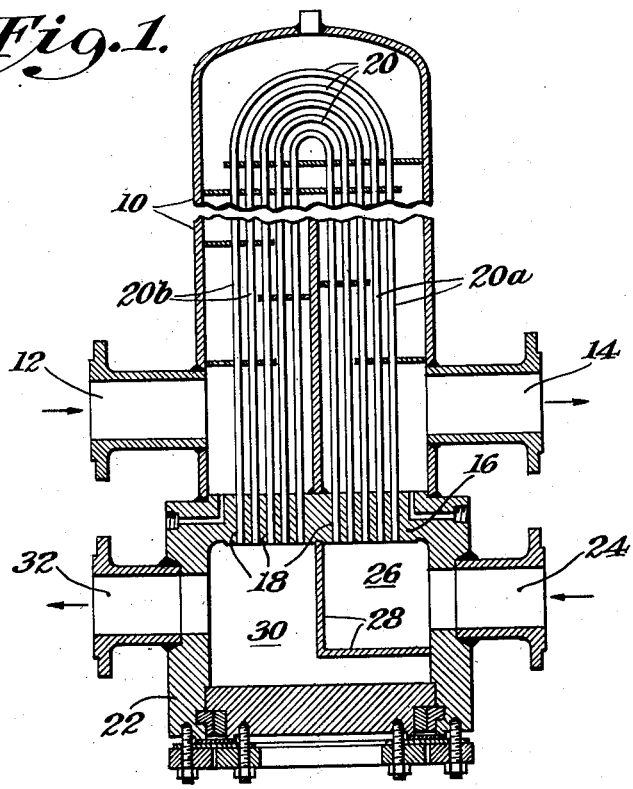
Figure 1 is a partial longitudinal section taken through the axis of a typical heat exchanger in a vertical position showing a number of tubes and their tube sheet.

Referring to Figure 1, we have shown a typical heat exchanger wherein 10 is a steel outer pressure shell having a liquid or vapor inlet nozzle 12 and outlet nozzle 14. At the lower end of shell 10 is a relatively thick metal tube sheet 16 formed with a plurality of bores 18 into which tubes 20 are inserted and connected as hereinafter described.

Heating or cooling fluids flowing within the tubes are isolated from shell side fluids and enter header 22 through inlet nozzle 24 and channel 26 formed by partition structure 28. Tube side fluids leave the system through channel 30 and outlet nozzle 32. In operation a fluid to be heated or cooled enters inlet nozzle 12 and flows in heat exchange relation over the tubes 20 to the outlet 14. Within the tubes 20 the heating or cooling fluid flows as directed by a lower inlet-outlet header 22 and as illustrated includes passage upwardly through tube legs 20a and downwardly through tube legs 20b.

Individual tube assemblies, which may number into the thousands, are preferably arranged symmetrically across the tube sheet face thus assuring a fuller and more intimate contact of the shell side fluids with the tubes with resultant higher efficiency of heat-transfer.

In forming sound welded tube to tube sheet connections in accordance with our invention and the disclosure of Figures 2 to 9, we first bore the requisite number of holes 18 in symmetrical or other spaced relation in a relatively thick metallic tube sheet 16. The exposed face 34 of the tube sheet 16 is then lightly machined around the holes to provide a smooth, clean recessed or chamfered surface 36. Prior to insertion of the tubes into the tube sheet bores all tube ends, tube sheet holes and the face of the tube sheet are thoroughly cleaned by washing and grinding so that the areas to be welded are free of all oil, grease or other foreign matter and so that there are no deposits of oxide present during welding.

Figure 5:
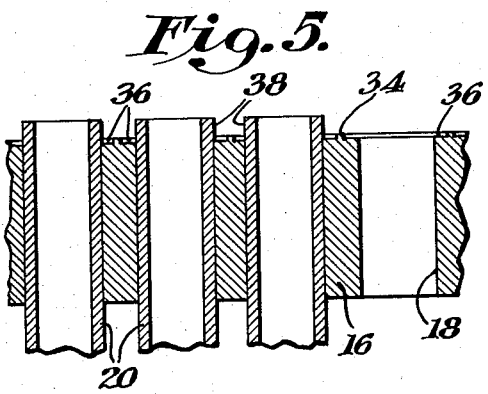
Figures 5–9 are partial detail views of the cross section of the tube sheet of Figure 1 showing various steps for joining heat exchanger tubes to a tube sheet in accordance with a preferred embodiment of our invention.

The tubes are inserted into the tube sheet with the ends of each tube 20 extending beyond the sheet face 34 a distance approximately equal to the thickness of the tube wall. When all the tubes are in their respective bores, each tube is internally rolled with a clean dry expander mandrel whereby it is lightly expanded to make perfect contact with the inside diameter of the bore and so that the tubes will have adequate support for light machining of their ends to insure uniformity of extension 38 beyond the tube sheet face 34 as illustrated in Figure 5. The tube expansion also aids in avoiding burning of the tube ends which is normally caused by inadequate transfer of heat away from the tubes during welding.

The actual forming of full strength welded joints in accordance with our invention is preferably accomplished by a two-pass method generally using the prior mentioned metal-arc process done in a horizontal or vertical plane. The welding rod used is treated by baking with subsequent hot, dry storage to keep the rod dry up to and during its use. Where two weld passes are employed, the first pass around each tube is put on completely before progressing to the next tube and all tubes receive first passes prior to the welding of any second pass on individual tubes. The first pass is laid rapidly to avoid tube end burning which frequently occurs where the members being united have a high thickness ratio, i.e. tube sheets which have at least five and maybe one hundred times the thickness of the tube wall.

Where it is necessary to weld in a vertical plane the weld desposition for each pass is laid so that the direction of travel is downhill rather than uphill and the welders tube to tube progression is from the bottom of the tube sheet or tube nearest a partition to the next upper or more distant tube so as to minimize deposition of splatter material on the unwelded areas.

Figure 6:
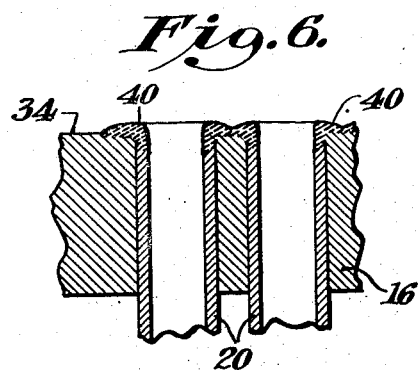
Figure 7:
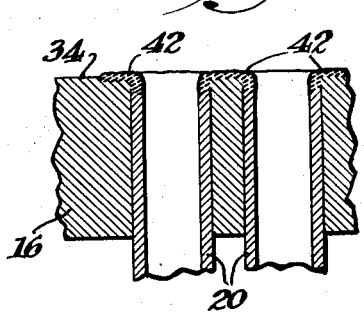

Figure 6 is illustrative of the tube to tube sheet joint after a first pass and shows the normal cross-sectional deposition pattern of such first pass 40.

Figure 2:
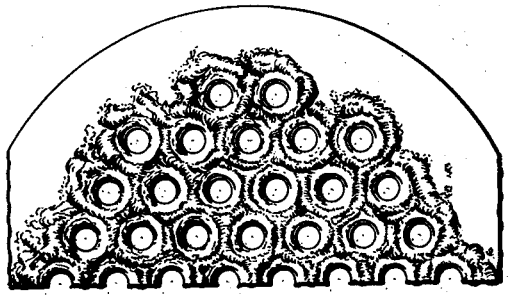
Figure 2 and 3 are typical representations of a tube sheet face during steps in our welding process.

Figure 2 is an illustration of an actual assembly of tubes to a tube sheet of dissimilar metal after a welding pass has been applied around each tube. An extremely rough surface condition is obvious and the opening into each tube is restricted by weld material.

Figure 4:
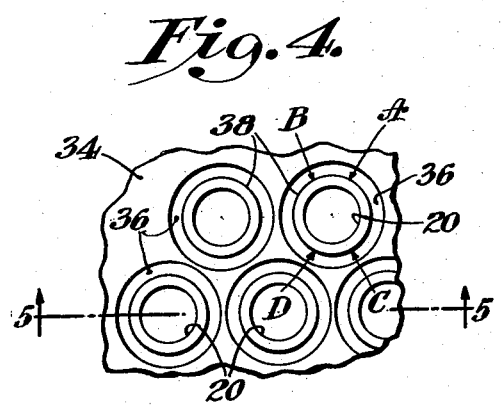
Figure 4 is an enlarged partial view of the face side of the tube sheet of Figure 1.

Figure 4 is intended to better show how we carry out our welding process when working in a vertical plane. In the figure a tube 20 is shown in position to receive a first pass. In accord with the downhill travel welding technique as previously mentioned, we start the first pass weld at an uphill point such as either A or B and deposit material in downhill fashion from A to point C counterclockwise or from B to point D clockwise. In this manner it is obvious that the first portion of the pass, say from A to C is counterclockwise downhill and the arc of material deposition is greater than 180°. By subsequently finishing the first pass by depositing material from B to D, clockwise downhill, in another arc of greater than 180°, we are assured of thorough overlap of the two portions of the pass.

Figure 3:
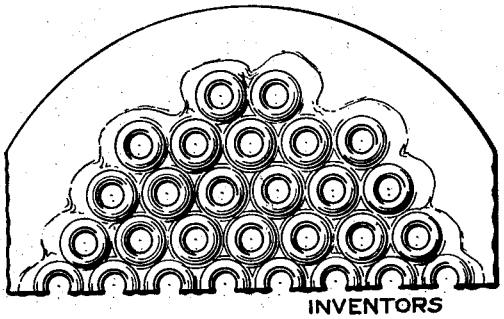

Subsequent to the first passes and while the welds and surrounding areas are still hot the joints formed are thoroughly wire brushed to clean away oxides and splatter material and the welding material is cold worked so as to eliminate any possibility of adhering slag or gas voids between passes and to stress relieve each joint. The general appearance of the first pass 42 after cold working is shown in cross section in Figure 7. Figure 3 is an illustration of an actual assembly of tubes to a tube sheet after cold working of the weld has been accomplished. The tube openings as shown are no longer greatly restricted and the tube sheet is provided with a relatively smooth cladded surface which is formed with rounded corners at the tube ends to provide smooth fluid flow conditions. Where the completed unit is to contain a great number of tube to tube sheet connections the welding and cold working operations are conducted for only a few tubes, as for example ten to fifteen at a time to assure that the welded areas are worked while still in a warm condition.

Figure 8:
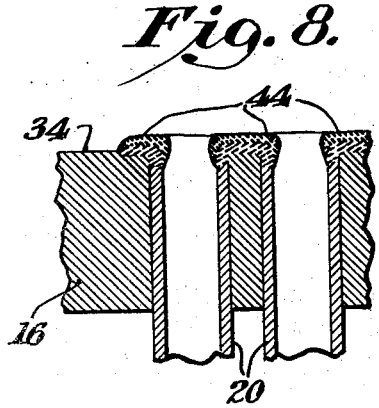
Figure 9:
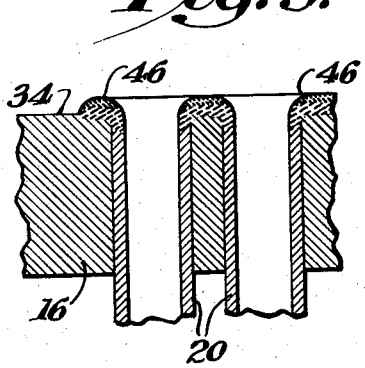

A second pass 44 is frequently necessary, and is added to the worked first pass 42 by the same downhill welding technique for vertical plane welding but with starts and stops of the second pass not in coincidence with starts and stops of the first pass. Figure 8 is illustrative of the cross-section deposition pattern of the tube to tube sheet joint after the second weld pass has been added to the first peened pass. In a like manner and while still warm the second pass is wire brushed and cold worked to form a dressed joint 46 which is stress relieved and which does not require a base drilling operation of the welded end.

After all welding and working operations are completed the tubes are reamed out with a reaming tool of a diameter approximately the same as the original nominal inside diameter of the tubes. The finished welded joints shown in typical cross-section in Figure 9, have proven to be capable of withstanding severe conditions of pressure and temperature and other physical and chemical attach and because of their smooth cold worked surfaces and reamed interior provide better flow conditions for the entering fluid than that provided even with a belled end rolled tube.

A typical example of the application of our method of tube to tube sheet joining is as follows:

Materials

Tubes:
   250 U shaped tubes _____ O.D. ⅝ inch.
   70–30 cupro-nickel _____ 16 gauge.
Sheets—steel _____ 2″ thick.
Welding rod _____ ³⁄₃₂″ coated Monel.
Number of welds _____ 500.

Cleaning

All tube ends, tube sheet holes and the face of the tube sheet were thoroughly cleaned with a hot water solution of Oakite followed by a thorough hot water rinse. These parts were then inspected to insure their freedom from all oil, grease and other foreign matter and to be sure that there was no heavy deposits of oxides in the areas to be welded.

Preweld assembly

The tubes were inserted into the tube sheets with the ends of each tube extending approximately 1/16" beyond the tube sheet face on the side to be welded. Each tube was anchored to the tube sheet by rolling in. After the rolling operation all tube ends which protruded more than 1/16" beyond the tube sheet face were machined back to within the 1/16" distance.

General welding conditions

All welding was done in a vertical position using a metal arc process operating on direct current with reversed polarity. The welding was done with a current of approximately 80 amps and a voltage of approximately 28 volts. Prior to use, the welding rod was baked at approximately 400° F. for a period of more than one hour and was stored in a warm, dry condition until use. Each weld consisted of two-passes with each pass being thoroughly brushed and cold worked before the material had completely cooled.

Sequence of weld deposits

The sequence of depositing the weld metal for both passes was left to the judgement of the individual welder except that the sequence met the following restrictions:

A. First pass around each tube was put on each tube completely before progressing to the next tube. Weaving techniques were not permitted.

B. All weld deposition for both passes was done in a downhill direction of travel.

C. In depositing the first pass, welding was started from the bottom tube of the tube sheet or tubes nearest a partition and the progression was such as to minimize slag splatter on the welded areas.

D. In welding the first pass, care was taken to be sure that start and stop locations of the first portion of the pass were overlapped by the second portion of the pass. Starts and stops of the second pass did not coincide with starts and stops of the first pass.

E. During all welding, care was exercised to be sure that no oils or other foreign matter were allowed to come in contact with the parts to be welded.

Reaming

After all welding and cold working operations were completed all tubes were reamed with a reamer which was approximately the diameter of the original nominal inside diameter of the tubes.

Physical testing

Subsequent to reaming, the tube-tube sheet assembly was mounted in a test header for determining the soundness of the welded joints. The tube welds were first cycled six times through a temperature range of between room temperature and 450° F. After such cycling a hydrostatic test under 6,000 p.s.i.g. was conducted to determine the resistance of the welds to thermal cycling stresses. No adverse effects were noted. A second series of five thermal cyclings through a temperature range of between room temperature and 700° F. with a further hydrostatic test up to 6,000 p.s.i.g. showed that all tubes were still completely tight.

Metallurgical examination

Metallurgical examinations of various sections of these welds showed that a complete metallic bond was formed between tube sheet and weld metal and between weld metal and the tube proper.

The foregoing example is illustrative of the operational features of our process but is not to be considered limiting thereof and we desire to comprehend within our invention such modifications as are included within the scope of the following claims.

We claim:

1. The method of strength welding and sealing a tube to a wall or the like which is provided with a bore forming a tube seat therein, said method comprising the steps of inserting the tube end to be welded through the tube seat to the extent that said tube end projects beyond the face of said wall or the like a distance approximately equal to the wall thickness of said tube, expanding the tube against the inner periphery of the tube seat to support said tube within said wall or the like, laying a pass of weld material around the periphery of said tube end to be welded to join said tube to said wall at the periphery of said tube seat whereby a metallic bond is formed between the wall and the weld material and between the weld material and the tube, cold working said weld material thus formed while said weld material is in a mildly heated condition to counterbalance the undesired internal stress distribution set up during said welding and to provide a compacted weld having a relatively smooth surface condition, and removing excess weld material within said tube opening.

2. The method of strength welding and sealing a tube to a wall or the like which is provided with a bore forming a tube seat therein, said method comprising the steps of inserting the tube end to be welded through the tube seat to the extent that said tube end projects beyond the face of said wall a distance approximately equal to the wall thickness of said tube, expanding the tube against the inner periphery of the tube seat to support said tube within said wall or the like, laying a first pass of weld material around the periphery of said tube end to be welded to join said tube to said wall at the periphery of said tube seat whereby a metallic bond is formed between the wall and the weld material and between the weld material and the tube, cold working the weld material of said first pass while in a mildly heated condition to counterbalance the undesired internal stress distribution set up during the laying of said first pass of weld material and to provide a compacted weld having a relatively smooth surface condition, laying a second pass of weld material over said compacted first pass of weld material, cold working the composite weld material of said passes while said material is in a mildly heated condition to counter balance the undesired internal stress distribution set up during the laying of said second pass of weld material and to provide a compacted weld having a relatively smooth surface condition, and removing excess weld material within said tube opening.

References Cited in the file of this patent

UNITED STATES PATENTS

| | | |
|---|---|---|
| 1,010,960 | Schickert | Dec. 5, 1911 |
| 1,857,912 | Jones | May 10, 1932 |
| 2,158,799 | Larson | May 16, 1939 |
| 2,237,716 | Spaulding | Apr. 8, 1941 |
| 2,304,976 | Watter | Dec. 15, 1942 |
| 2,538,098 | Henrard | Jan. 16, 1951 |
| 2,709,295 | Chyle | May 31, 1955 |
| 2,721,379 | Chapman | Oct. 25, 1955 |
| 2,785,459 | Carpenter | Mar. 19, 1957 |

FOREIGN PATENTS

| | | |
|---|---|---|
| 349,924 | Great Britain | May 28, 1931 |
| 671,564 | Germany | Feb. 9, 1939 |